Figure 1:
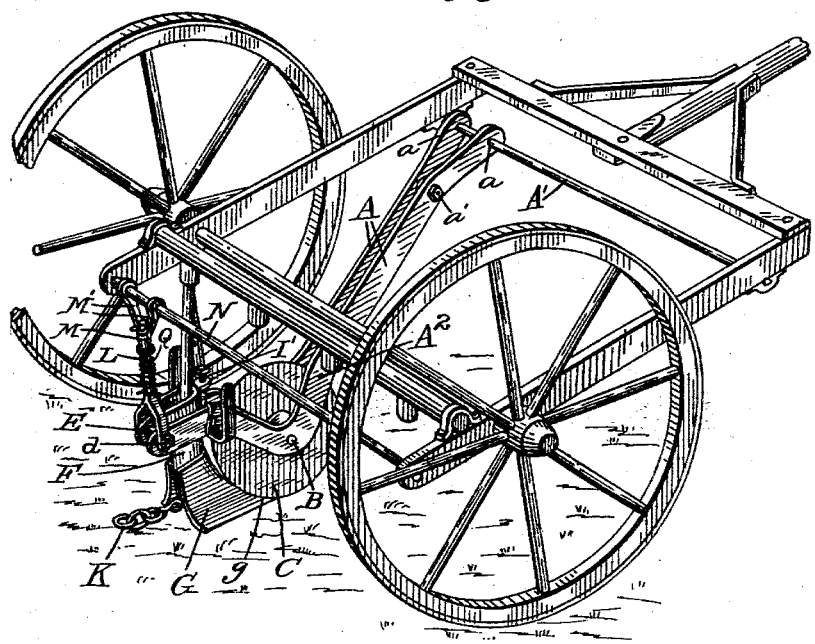

(No Model.)

W. BANWARTH.
GRAIN DRILL.

No. 562,755. Patented June 23, 1896.

Witnesses
Edwin G. McGee
A. E. Hall

Inventor
William Banwarth
BY John Wedderburn
Attorney

UNITED STATES PATENT OFFICE.

WILLIAM BANWARTH, OF ZELL, SOUTH DAKOTA.

GRAIN-DRILL.

SPECIFICATION forming part of Letters Patent No. 562,755, dated June 23, 1896.

Application filed October 15, 1895. Serial No. 565,769. (No model.)

*To all whom it may concern:*

Be it known that I, WILLIAM BANWARTH, a citizen of the United States, residing at Zell, in the county of Faulk and State of South Dakota, have invented certain new and useful Improvements in Grain-Drills; and I do hereby declare the following to be a full, clear, and exact description of the invention, such as will enable others skilled in the art to which it appertains to make and use the same.

This invention relates to certain new and useful improvements in grain-drill teeth and their means for connection or attachment to the frame of the seeder or planter; and it has for its objects, among others, to provide a simple and cheap attachment that can be readily applied and which is so constructed that the long point running in the ground will simply raise the soil sufficiently to deposit the seed at the required depth and then allowing the soil to drop back in place, giving the seed a more thorough covering than by the prior forms. The revoluble colter is placed immediately in front of the point of the drill-tooth and it cuts its way through the straw and other rubbish and thereby obviating all danger of clogging and at the same time being a great factor in lightening the draft. Within the lower part or heel of the tooth is a seed-spreader, which serves to spread the seed, as will be readily understood as the description proceeds.

Other objects and advantages of the invention will hereinafter appear, and the novel features thereof will be specifically defined by the appended claims.

The invention in this instance resides in the peculiar combinations and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 2:
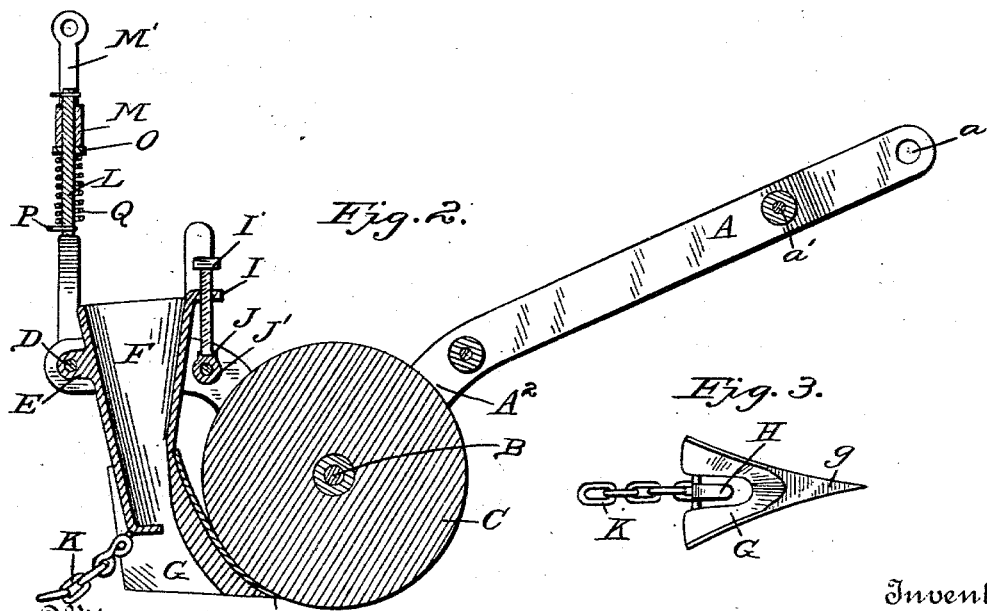
Figure 3:
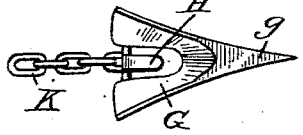

Figure 1 is a perspective view of a planter-frame, showing the application of my invention. Fig. 2 is a substantially central longitudinal vertical section through the improvement, on an enlarged scale. Fig. 3 is a plan view of the drill-tooth and its point.

Like letters of reference indicate like parts throughout the several views.

Referring now to the details of the drawings by letter, A designates two substantially parallel bars, the forward ends of which are sprung outward, as shown, and are provided with openings $a$ for the passage of the rod upon which they are designed to be supported. In Fig. 1 this rod is lettered A' and is supported from the side bars of the planter-frame. These two bars are connected together near their front end by the bolt $a'$. At a point near their rear ends these bars are curved downward, as seen at $A^2$, and in these curved portions is journaled the shaft B, which carries the colter C, which is mounted to revolve thereon.

D is a rod or bolt held in the rear ends of these bars and retained by the nuts $d$. Sleeved on this rod or bolt between the bars is the sleeve E, to which is secured the spout F, upon the lower end of which is the drill-tooth G, which has a long point $g$, the upper and forward face of which is curved to conform to the curvature of the colter, as shown. Within the lower part or heel of this tooth is the spreader-bar H, which serves to spread the seed as it falls from the spout into the tooth. The forward upper face of the spout is provided with the forwardly-extending lug I, through which passes the screw I', which bears in a socket J on the sleeve J', which is held on a rod or bolt between the parallel bars to the rear of the colter-shaft and in advance of the spout. The adjustment of this screw regulates the distance of the point of the tooth from the colter, as will be readily understood.

K is a chain which is held at one end on a hook or other suitable means on the heel of the tooth and adapted to drag behind and break up, cover the seed, and even the soil.

L is a bifurcated rod, the forks of which are pivotally mounted on the rear cross-rod or bolt in the arms A, and sleeved upon the upper end of this rod is the sleeve M, having the forked arms M', perforated to receive the rod N, upon which they are sleeved, as seen in Fig. 1. This sleeve is held against too far upward movement in any suitable manner, and upon the rod below this sleeve is sleeved the collar or washer O, between which and a suitable stop P on the lower end of the rod is a spring Q, all as clearly shown.

With the parts constructed and arranged substantially as above set forth the operation will be readily understood, especially when taken in connection with the annexed drawings, and a further detailed description thereof is not deemed necessary.

Modifications in detail may be resorted to without departing from the spirit of the invention or sacrificing any of its advantages.

What I claim as new is—

1. The combination with the supporting-bars and the revoluble colter carried thereby, of the pivotally-mounted drill-tooth and means for varying the position of its point with relation to the colter, as set forth.

2. The combination with the supporting-bars and the revoluble colter carried thereby, of the spout having a lug and carrying the drill-tooth, and a set-screw passed through said lug and engaging a part on said bars to adjust the point of the tooth, substantially as specified.

3. The combination with a colter, of a pivotally-mounted drill-tooth, having a long point, the upper and forward face of which is curved to conform to a radial colter as set forth.

4. The combination with a revoluble colter and a pivotally-mounted drill-tooth immediately in the rear thereof, of means for adjusting the point of the tooth with relation to the colter, substantially as specified.

In testimony whereof I have signed this specification in the presence of two subscribing witnesses.

WILLIAM BANWARTH.

Witnesses:
HENRY A. FANGMAN,
GEORGE PANIAN.